No. 794,949. Patented July 18, 1905.

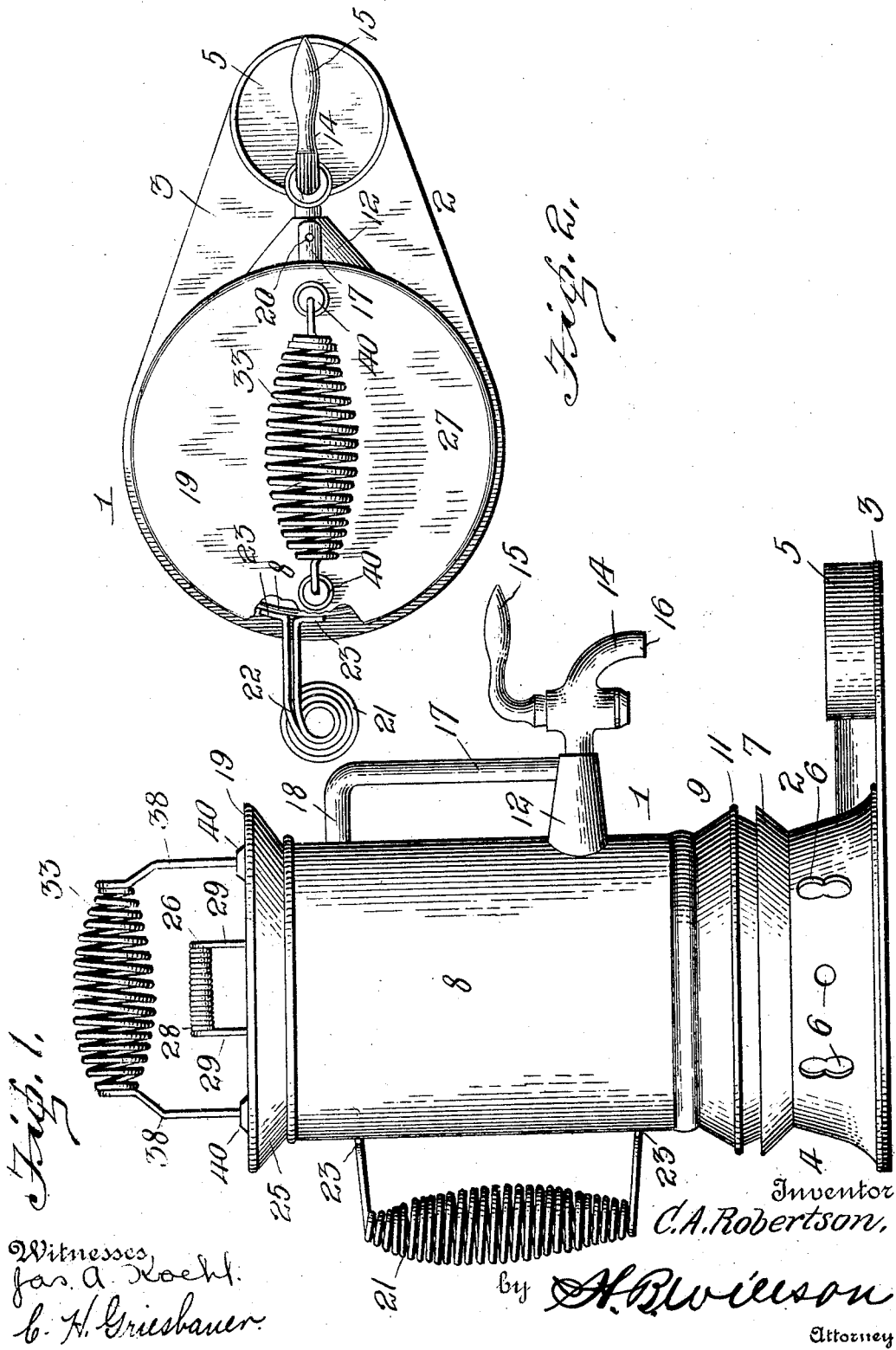

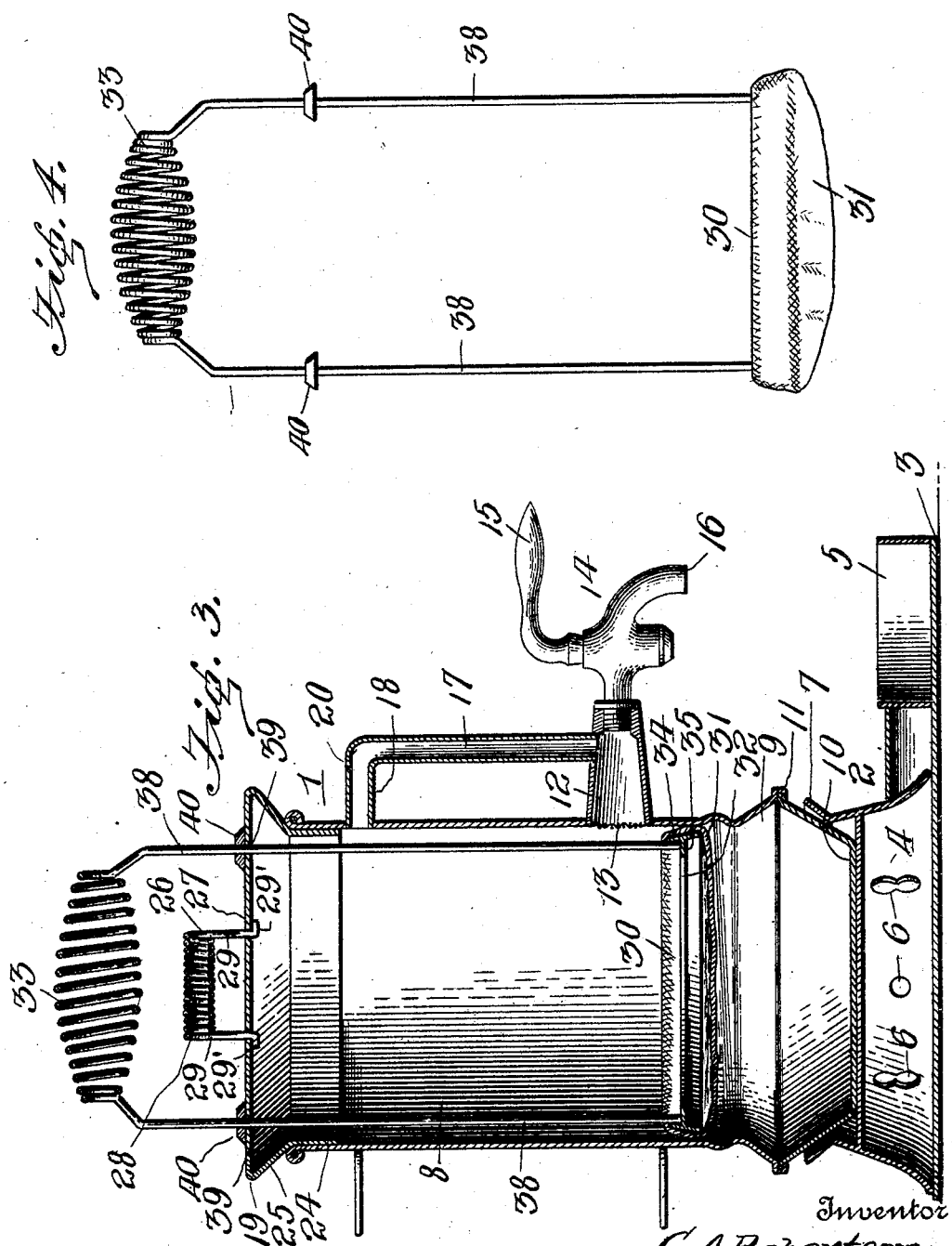

UNITED STATES PATENT OFFICE.

CULLEN ANDREW ROBERTSON, OF GRINNELL, IOWA, ASSIGNOR TO ROBERTSON MANUFACTURING COMPANY, OF DALLAS, TEXAS, A CORPORATION OF TEXAS.

COFFEE-URN.

SPECIFICATION forming part of Letters Patent No. 794,949, dated July 18, 1905.

Application filed February 16, 1905. Serial No. 245,947.

*To all whom it may concern:*

Be it known that I, CULLEN ANDREW ROBERTSON, a citizen of the United States, residing at Grinnell, in the county of Poweshiek and State of Iowa, have invented certain new and useful Improvements in Coffee-Urns; and I do declare the following to be a full, clear, and exact description of the invention, such as will enable others skilled in the art to which it appertains to make and use the same.

My invention relates to improvements in coffee pots or urns; and it consists in certain novel features of construction, combination, and arrangement of parts hereinafter described and claimed.

The object of my invention is to improve and simplify the construction and operation of devices of this character, and thereby render the same more convenient and efficient in use and less expensive to manufacture.

The above and other objects, which will appear as the nature of my invention is better understood, are accomplished by the construction illustrated in the accompanying drawings, in which—

Figure 1 is a side elevation of the coffee-urn constructed in accordance with my invention. Fig. 2 is a top plan view of the same. Fig. 3 is a vertical sectional view, and Fig. 4 is a side elevation of the strainer-supporting frame removed from the urn.

Referring to the drawings by numeral, 1 denotes my improved coffee pot or urn, and 2 denotes a base or stand upon which the same is supported. This stand is provided for the purpose of protecting the table or the like upon which the device is placed, and it consists of a base-plate 3, having at one end a raised circular portion 4 to support the bottom of the coffee-pot and at its opposite end a circular band or ring 5, adapted to receive a cup or other receptacle into which coffee from the urn 1 is to be poured. The portion 4 of the stand has its top and sides formed with openings 6, which permit of a free circulation of air through the same to prevent the stand from becoming as hot as the coffee-urn. Said portion 4 is also formed at its top with an annular flange 7, which is adapted to prevent the coffee-urn from slipping off of the same.

The coffee-urn 1, as shown, consists of a cylindrical body portion 8, having an open top and an outwardly flared or enlarged lower end 9, its bottom 10 having its seam or connection 11 with the lower end of the cylindrical body 8 above the plane of said bottom, so as to prevent the danger of the solder in said seam becoming melted by the flames or heat of the fire over which the coffee in the urn is made. The lower end 9 of the coffee-urn is flared or enlarged, so as to render the same less liable to be overturned and to increase the heating-surface which is in contact with the stove when coffee is being made in the urn. Some distance above the enlarged end 9 of the body 8 is a horizontally-disposed V-shaped outlet conductor or pipe 12, which has at its inner end a fine screen or strainer 13 and at its outer end a discharge-faucet 14. The latter is of well-known form, having a turning plug-valve operated by a handle 15 and having its spout 16 so disposed that when the coffee-urn is placed upon the portion 4 of the stand 2 the coffee discharged from said spout will fall into a cup and saucer placed upon the supporting-ring 5. In order to facilitate the discharge of the coffee from the urn, I provide an air-vent tube 17, which has its lower end projecting from and in communication with the interior of the outlet-pipe 12 and its upper end extending inwardly at right angles, as shown at 18, and opening into the upper portion of the body 8 at a suitable point below the cover 19 upon the latter. The upper portion of the tube 17 is formed with an opening 20, which permits air to enter the coffee-pot for the purpose explained. Upon the rear portion of the body 8 is provided a handle 21, which preferably consists of two pieces of heavy wire coiled intermediate their ends, as shown at 22, to form a hand-grip and having their ends bent outwardly, as shown at 23, and soldered upon the outside of the body 8. The ends of these wires at the upper and lower ends of the hand-grip are bent in opposite directions, so that the latter will be prevented from turning or twisting. The cover 19 of the body 8 of the coffee-urn is removably held upon the same by a broad flange 24, which engages the interior of the upper end of the body 8, so as to form a fluid-tight closure. Said cover has a flared portion 25, which permits it to be readily applied to or removed from the body 8, and for this purpose a handle 26 is also provided upon the center of the top plate 27 of said cover. Said handle 26, as shown, consists of a single piece of heavy wire coiled, as shown at 28, and having its ends 29 projecting through the plate 27 and bent at right angles, so as to permit them to be readily soldered, as shown at 29'.

Within the body 8 is a strainer 30, which may be raised and lowered therein. The latter consists of a strainer fabric 31, a supporting or holding frame 32 therefor, and an operating handle or device 33. The frame 32 comprises a tapered ring or circular band 34, which is of slightly less diameter than the interior diameter of the body 8 and which has an inwardly-projecting annular flange 35, to which the handle or operating device 33 is secured. The latter is in the form of a long bail, which is slidably mounted in the cover 19 and which, as shown, is formed of a single piece of heavy wire coiled upon itself, as shown at 33, to form a hand-grip, and having its legs 38 projecting through and sliding in openings 39, formed in the top plate 27 of said cover. Suitable stops 40 are provided upon the legs 38 to limit the downward movement of the strainer in the body 8. The strainer fabric, which may be of any desired form, is adapted to cover the bottom and sides of the frame 32 and engage the inner face of the body 8, so as to cause the strainer to fit snugly therein.

When it is desired to make coffee in the urn, the cover and strainer are removed and the ground coffee and boiling water are then placed in the body 8. The cover is then placed upon the top of the latter and the strainer 30 is elevated or drawn up into the upper portion of the body until the contents of the same has boiled about a minute. I then remove the urn from the stove or heater, so that its contents will not boil for a couple of minutes, and then move the strainer to the lower portion of the body, so that it will be disposed between the coffee-grounds upon the bottom 10 and the outlet-pipe 12, as shown in Fig. 3 of the drawings. When the parts are in this position, coffee will pass upwardly through the strainer fabric 31, and all grounds will be retained beneath the same in the enlarged portion 9 of the body.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A coffee-pot comprising a cylindrical body having a flared or enlarged bottom, a coiled wire handle at one side of said body, an outlet-pipe at the other side of said body, a strainer in said outlet-pipe, a faucet in said outlet-pipe an air-vent tube between said outlet-pipe and the upper portion of said body and formed with an air-inlet opening, a removable cover upon said body, a strainer slidably mounted in said body, and an operating-handle for said strainer projecting through said cover, said strainer being adapted to be raised and lowered between the bottom of said container and said outlet-pipe, substantially as described and for the purpose set forth.

In testimony whereof I have hereunto set my hand in presence of two subscribing witnesses.

CULLEN ANDREW ROBERTSON.

Witnesses:
G. KERSHAM,
E. H. ARCHER.